United States Patent [19]

Chenausky et al.

[11] Patent Number: 4,512,021

[45] Date of Patent: Apr. 16, 1985

[54] PASSIVELY Q-SWITCHED SQUARE BORE WAVEGUIDE LASER

[75] Inventors: Peter P. Chenausky, Avon; Richard A. Hart, Wethersfield, both of Conn.

[73] Assignee: United Technologies Corporation, Hartford, Conn.

[21] Appl. No.: 369,294

[22] Filed: Apr. 16, 1982

[51] Int. Cl.³ .............................................. H01S 3/10
[52] U.S. Cl. ...................................... 372/20; 372/11; 372/19; 372/97; 372/28; 372/95; 372/64; 372/99; 372/18
[58] Field of Search .............................. 372/11, 18–20, 372/26, 28, 97, 102, 98, 99, 92, 95, 64

[56] References Cited

U.S. PATENT DOCUMENTS

| 3,134,837 | 5/1964 | Kisliuk et al. | 372/19 |
| 3,586,998 | 6/1971 | Gould | 372/11 |
| 3,638,137 | 1/1972 | Krupke | 372/11 |
| 3,764,937 | 10/1973 | Skolnick et al. | 372/11 |
| 4,174,504 | 11/1979 | Chenausky et al. | 372/102 |

OTHER PUBLICATIONS

See et al., "Coupled optical resonators for the enhancement of laser infracavity power", *Appl. Optics*, vol. 20, No. 7, Apr. 1, 1981.

Boersch et al., "Measurement of Length Shifts Down to $10^{-5}$ Å with a Three-Mode Laser", *IEEE Jour. of Quant. Elect.* QE-10, No. 6, Jun. 1974.

Wiesemann, "Longitudinal Mode Selection in Lasers with Three-Mirror Reflectors", *Appl. Optics*, vol. 12, No. 12, Dec. 1973.

*Primary Examiner*—William L. Sikes
*Assistant Examiner*—Léon Scott, Jr.
*Attorney, Agent, or Firm*—Eric W. Petraske

[57] ABSTRACT

A waveguide laser having a square bore and an external modulator has its power doubled by proper relationship of a coupled cavity external to a cavity in the waveguide medium.

5 Claims, 4 Drawing Figures

PRIOR ART
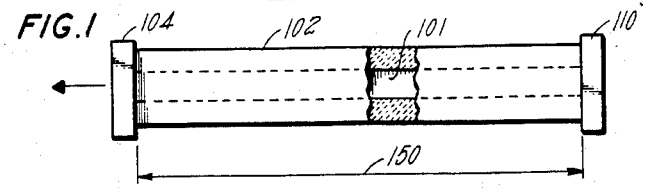
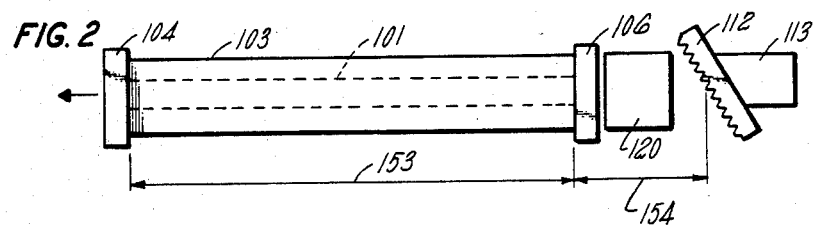
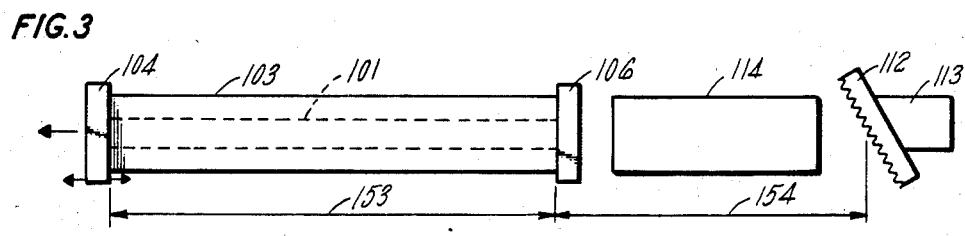
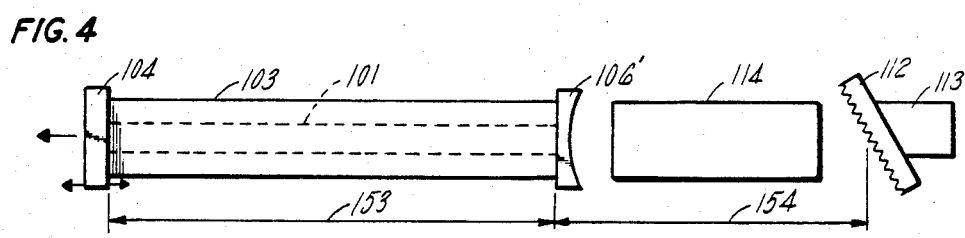

PASSIVELY Q-SWITCHED SQUARE BORE WAVEGUIDE LASER

The Government has rights in this invention pursuant to Contract No. DAAK80-79-C-0302 awarded by the Deparment of the Army.

TECHNICAL FIELD

The field of the invention is that of a modulated waveguide laser.

BACKGROUND ART

In situations where small lightweight lasers are required, a desirable configuration is a waveguide laser. If the optical cavity of the laser is bounded by mirrors internal to the waveguide, the laser will be very simple, but also very limited in the manner in which the output may be modulated for use in laser rangefinders or in laser radar. A long standing problem has been to add an intracavity modulator to a waveguide laser with tolerable losses.

It is generally accepted in the art that a waveguide cavity may be extended slightly by displacing a mirror from one end of the waveguide, but that the mirror can be displaced from the end of a waveguide by only one or two characteristic transverse lengths (waveguide diameters or transverse dimension) without incurring a substantial diffractive loss of power from the waveguide mode once propagation out of the guiding structure occurs.

The prior art teaches (Degnan and Hall IEEE Journal of Quantum Electronics Vol. QE-9, No. 9) that waveguide lasers may have a single cavity that is extended substantially beyond the guided region in order to include an intracavity modu-lating element and suffer acceptable optical loss when the displaced mirror focuses the freespace mode back into the waveguide. Such low-loss extnsion of cavity length can be achieved for only a limited range or combinations of mirror radius and guide diameter. For example, an article by Lyszyk et al in Optics Communications, Feb. 1981, p. 327ff shows that for a conbination of 26 cm radius of curvature mirror and 1.5 mm diameter waveguide, a separation of 26 cm between the mirror and the waveguide permits the laser to operate at maximum power, but the power falls by a factor of 2 for a separation distance of 24 cm or 28 cm. If a mirror having a 22 cm radius of curvature is used, the maximum power is half the reference value, for all mirror positions.

If the waveguide cross section is increased, the guide-to-mirror separation for full power is also increased, but the criticality of the separation distance remains. For example, a waveguide diameter of 2 to 3 mm would require a guide-to-mirror distance of at least 50 cm. Such a great extension length would have a significant adverse effect on the mechanical stability of the cavity and thus on the optical stability of the laser.

An article in Optics Communications (Vol. 4, No. 4, page 283 (1971) by Bjorkholm et al discloses the use of two freespace coupled cavities with planar mirrors, one of which contains a gain medium and the other of which is a Fabry-Perot etalon providing frequency control by means of a grating. Those skilled in the laser art would expect, in view of the above experiments and the state of the art, that a combination of waveguide gain medium and planar mirrors (or grating) would be possible only if the guide-to-grating distance were not more than several waveguide diameters. However, U.S. Pat. No. 4,241,319, issued to Aristotle Papayoanou on Dec. 30, 1980, suggests that a waveguide laser may be used with a Fabry-Perot etalon that is sufficiently long to accomaodate a Stark cell used to tune and/or to modulate the laser. The patent indicates that diffraction losses can be a problem, but does not disclose a comparison of power levels for that laser and a laser without an extended cavity.

For a device that must be used in the field and so has power and weight limitations, as well as stringent stability requirements, active modulation of the type shown in the '319 patent is not attractive.

DISCLOSURE OF INVENTION

The invention is an improved passively Q-switched square bore waveguide laser having two coupled cavities, one guided-wave cavity spanning the gain medium, the other freespace cavity enclosing the modulator.

BRIEF DESCRIPTION OF DRAWINGS

FIG. 1 illustrates a prior art waveguide laser;

FIG. 2 illustrates a waveguide laser having a variable-length Fabry-Perot etalon; and FIG. 3 illustrates an embodiment of the invention having a substantially fixed Fabry-Perot etalon.

BEST MODE FOR CARRYING OUT THE INVENTION

FIG. 1 illustrates a prior art waveguide laser in which a gain medium, such as $CO_2$, is enclosed within rectangular waveguide 101 illustratively having cross section dimensions of 2.26 mm×2.26 mm. This waveguide bore is enclosed within waveguide 102 which is bounded on one end by partially reflecting mirror 104 having a high reflectivity and mirror 110 haing essentially 100 percent reflectivity. The distance between the reflective surfaces of these two mirrors, typically 35 cm, is indicated as distance 150 in the drawing and is the cavity length. A laser having this configuration has been observed to produce a power output passing through mirror 104 of 16 watts and serves as a baseline reference. Unfortunately, such a laser is not modulated and is not suitable for applications requiring pulses of radiation.

Experiments have shown that extending cavity length 150 (by 17 cm) to accomodate a modulator decreased the power compared to the baseline by a factor of two and substituting a planar grating for a curved mirror reduced the power by a second factor of four or more.

Straightforward adaptation of the laser in the '319 patent to use a passive Q-switch would result in the configuration shown in FIG. 2, where mirror 106 has a reflectivity such that sufficient power enters the modulation cavity to saturate the $SF_6$ in cell 120. Note that this is in contrast to the '319 patent, where the reflectivity is such that the Stark cell does not saturate. The length 154 of the modulation cavity should be as short as possible, in order to reduce diffraction losses associated with using the planar grating.

However, such a laser with mirror 106 reflectivity of 30% and length 154 of 8.5 cm suffered from sporadic pulsing. It would emit Q-switched pulses 200 ns wide in the desired 50 khz to 100 khz repetition frequency range, but the average laser power would cycle between full off and full on at a rate of approximately one second.

If the reflectivity of mirror 106 is increased to about 85%, in order to ake cell 120 less susceptible to thenmal problems, it would be expected that the $SF_6$ pressure would also be altered. However, it is found that the pressure range of the $SF_6$ gas (less than 0.1 torr of $SF_6$ and several torr of He) is abnonmally critical. If the pressure range is too low, the Q-switch is not able to turn the laser off and if it is too high, the pulse lasing is extinguished because an output coupling from mirror 104 and loss at mirror 106 of 15% is too large and the laser remains below threshold. If the length of cell 120 is increased so that the same number of $SF_6$ molecules may be used (for absorption) but at a lower pressure, (so collisional deactivation during the pulse will not be a problem), laser operation at a fixed pulse repetition frequency cannot be maintained. The device suffers from a problem comaon to the laser of the '319 patent -the device is operating in the "reflectivity notch" of the Fabry-Perot etalon because the notch is the only region in which coupled cavity length (154) tuning controls the effective phase shift of the etalon. In the notch region, however, the phase and reflectivity are such sensitive functions of length 154 that neither fixed pulse repetition frequency nor stable average power operation is achievable, with the resulting transmitter output being so unstable that it is not a practical field instrument.

A laser which solves the difficulties with the prior-art approach is shown in FIG. 3, in which length 154 is approximately 15-20 cm, the pressure of $SF_6$ in cell 114 is less than 0.5 torr and the active cell length is 12 cm. The cavity length 153 is approximately 44 cm, with a reflectivity of mirror 106 in the range of 60%-85%. With this invention the cavity length 154 being greater than 50 times the waveguide transverse dimension is reasonable.

The optimum value of reflectivity would depend on the desired transmitter repetition frequency and the gain length of the active $CO_2$ medium. Overall, sufficient cavity photon flux must pass through mirror 106 to force the $SF_6$ to saturate; however, the $SF_6$ and buffer gas pressure must be sufficiently high so that intrapulse deactivation occurs without allowing interpulse effects to dominate. Length 153 is then controlled with a PZT on mirror 104 to set the laser frequency and maintain the desired fixed pulse repetition frequency.

A pulsed laser constructed according to these teachings will exhibit perfonmance advances over those of prior art teachings in general and particularly with respect to the '319 patent. For example, for lasers which are to be modulated by mechanisms which do not exhibit saturation phenomena (such as an electrooptic CdTe phase modulator), the reflectivity of mirror 106 may be chosen to be much lower, say 30% reflectivity, so that substantially complete laser frequency control may be effected by optical element 112. This greatly reduces the aechanical complications associated with having to operate by flexing a vacuum interface as is necessitated by requiring the PZT to be located at mirror location 104 or 106.

In cases where only a full-off or full-on modulation function on a particular grating selected transition is desired, mirror 106 reflectivity and cavity length 154 may be chosen to force laser operation on the single lowest loss transverse mode of the compound resonator system. In the particular case where a low frequency square wave modulation format is desired, such modulation may be provided by a thin rotating disc in which there are alternately 100% transmittion and 100% absorbing regions. In this case, mirror 106 reflectivity would be chosen as high as possible and length 154 be chosen as short as possible so that the mirror 106 reflectivity and grating feedback is adjusted to allow only the grating controlled transition to oscillate.

One problem that demands careful attention is that of suppressing undesired modes that have parameters close to that of the desired mode. One method is to employ the diffraction loss difference between the lowest loss transverse mode and the next lowest loss transverse mode used to discriminate against higher order mode operation. The operating condition may be experimentally determined by step-wise increasing length 154 until only single lowest order mode operation is observed. Alternatively, the optical figure of optical element 112 could be chosen in conjunction with the diffraction dependent propagation loss over the round trip distance 154 to force desired mode control of laser output through mirror 104. Such mode control could not in general be effected by a mere reflectivity choice at mirror 106 since that reflectivity would not be mode dependent.

An alternative version of mode control is to form mirror 106 into a diverging lens—i.e., the outer surface of mirror 106 is concave. The second cavity is then an unstable optical cavity that very effectively discriminates against undesired modes.

We claim:

1. A waveguide laser comprising a first optical cavity, having a first cavity length, including first and second mirrors and an optical waveguide having a characteristic transverse length disposed therebetween, a gain medium being disposed within said waveguide;

means for exciting said gain medium, whereby guided-wave laser radiation is resonated within said first optical cavity; and a second freespace optical cavity coupled to said first optical cavity by said second mirror and including a radiation modulating element and a grating disposed on a side of said radiation modulating element opposite said second mirror, said second cavity having a modulating cavity length, characterized in that:

said radiation modulating element is a bleachable passive Q-switch containing a gas at a predetermined density;

said modulation cavity length being at least fifty times longer than said transverse length; and said first cavity length is controlled to maintain said laser in stable operation whereby radiation resonated in a waveguide mode within said waveguide is coupled efficiently to radiation in a free space mode within said freespace optical cavity.

2. A waveguide laser according to claim 1, in which said second mirror and said grating form a Fabry-Perot etal on having a etalon reflectivity that is a slowly-varying function of the spacing between said second mirror and said grating.

3. A waveguide laser according to claim 1, in which said waveguide supports at least two transverse modes, one of said transverse modes being a desired mode, further characterized in that said grating, in conjunction with the modulating cavity length, has a predetermined optical figure that reflects preferentially radiation of said desired mode.

4. A waveguide laser comprising a first optical cavity, having a first cavity length including first and second mirrors and an optical waveguide having a characteristic transverse length disposed therebetween, a gain medium being disposed wdthin said waveguide;

means for exciting said gain medium, whereby guided-wave laser radiation is resonated within said first optical cavity; and a second freespace optical cavity coupled to said first optical cavity by said second mirror and including a radiation modulating element and a grating disposed on a side of said radiation modulating element opposite said second mirror, said second cavity having a modulating cavity length, characterized in that:

said second mirror has an outer surface oriented towards said freespace optical cavity and said grating has a grating surface oriented toward said outer mirror surface, said outer mirror surface being non-planar whereby radiation in higher-order modes in said freespace cavity is coupled less efficiently into said waveguide than radiation in low-order modes; and said second cavity is an unstable optical resonator.

5. A waveguide laser according to claim 4, in which said second mirror has an outer surface within said second optical cavity, which second surface is concave, whereby said second optical cavity is optically unstable.

* * * * *